United States Patent [19]

Oohara et al.

[11] Patent Number: 5,801,704
[45] Date of Patent: Sep. 1, 1998

[54] THREE-DIMENSIONAL INPUT DEVICE WITH DISPLAYED LEGEND AND SHAPE-CHANGING CURSOR

[75] Inventors: Shunichi Oohara, Chiyoda-machi; Masakazu Ejiri, Tokorozawa; Yasuhiro Nemoto, Ogawa-machi; Naoki Sasaki, Chiyoda-machi; Hidefumi Ohtsuka, Chiyoda-machi; Shogo Matsumoto, Chiyoda-machi; Ryoko Sato, Chiyoda-machi; Kazushi Yoshida, Chiyoda-machi, all of Japan

[73] Assignee: Hitachi, Ltd., Tokyo, Japan

[21] Appl. No.: 515,450

[22] Filed: Aug. 15, 1995

[30] Foreign Application Priority Data

Aug. 22, 1994  [JP]  Japan ................... 6-196632

[51] Int. Cl.$^6$ .............................................. G06F 3/00
[52] U.S. Cl. .................. 345/358; 345/352; 345/355; 345/157; 345/145
[58] Field of Search .................. 395/154–161, 395/326–358, 119–127, 133, 136–139, 753; 345/156–158, 123–125, 121, 126, 145–146; 340/407.1, 407.2, 815.4; 463/4; 382/168; 600/146

[56] References Cited

U.S. PATENT DOCUMENTS

| | | | |
|---|---|---|---|
| 4,988,981 | 1/1991 | Zimmerman et al. | 345/158 |
| 5,252,951 | 10/1993 | Tannenbaum et al. | 345/156 |
| 5,347,295 | 9/1994 | Agulnick et al. | 345/156 |
| 5,381,158 | 1/1995 | Takahara et al. | 345/156 |
| 5,423,554 | 6/1995 | Davis | 463/4 |
| 5,454,043 | 9/1995 | Freeman | 382/168 |
| 5,481,454 | 1/1996 | Inoue et al. | 395/753 |
| 5,512,919 | 4/1996 | Araki | 345/156 |
| 5,524,187 | 6/1996 | Feiner et al. | 395/119 |
| 5,524,195 | 6/1996 | Clanton, III et al. | 395/155 |
| 5,558,619 | 9/1996 | Kami et al. | 600/146 |

FOREIGN PATENT DOCUMENTS 62-44827  2/1987  Japan ................ G06F 3/037

OTHER PUBLICATIONS

Shinohara, "Network Virtual Reality System", Pixel, No. 32, non–english, pp. 26–28, 1993.
Zimmerman et al., "A Hand Guesture Interface Device", CHI+GI 1987, pp. 189–192, Apr. 9, 1987.
Su et al., "The Virtual Panel Architecture: A 3D Gesture Framework", IEEE, pp. 387–393, 1993.
Kahaner, "Japanese Activities in Virtual Reality", IEEE Computer Graphics and Applications, Jan. 1994.
Morita et al., "A Computer Music System That Follows a Human Conductor", IEEE Computer, pp. 44–53, Jul. 1991.
Ishibuchi et al., "Real Time Hand Gesture Recognition Using 3D Prediction Model", IEEE, pp. 324–328, Oct. 1993.

*Primary Examiner*—John E. Breene
*Attorney, Agent, or Firm*—Antonelli, Terry, Stout & Kraus, LLP

[57] ABSTRACT

In an image processing apparatus for performing image processing of a processed object by displaying the processed object and an operating cursor on an image display device, and by operating the operating cursor according to three-dimensional actions of the hand and the fingers of an operator, a processing function and a shape of the operating cursor are changed by judging the meaning of the three-dimensional actions of the hand and the fingers to support understanding of the processing function.

8 Claims, 10 Drawing Sheets

FIG. 3
| FUNCTION | CURSOR SHAPE | INSTRUCTION OF SELECTION |
|---|---|---|
| INSTRUCTION (POINT) |  | 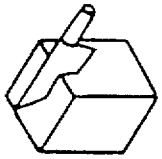 |
| DEFORMATION (PUSH) |  | 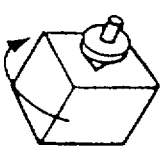 |
| DEFORMATION (PULL) |  | 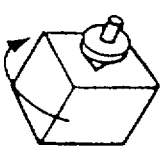 |
| DISPLACEMENT |  | 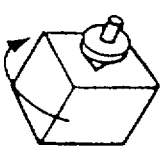 |
| FUNCTION | CURSOR SHAPE | INSTRUCTION OF SELECTION |
|---|---|---|
| PARALLEL DISPLACEMENT | 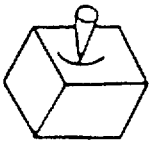 |  |
| PLANE FORMING | 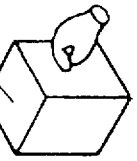 | IBIDEM |
| CUTTING | 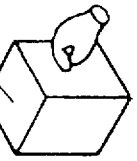 | IBIDEM |
| ROTATION | 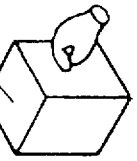 | 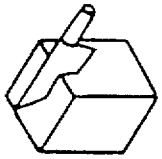 |

FIG. 4
| FUNCTION | IMAGE PROCESSING | CURSOR OPERATION |
|---|---|---|
| SCROLL | 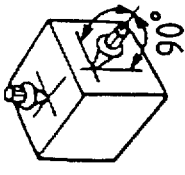 | 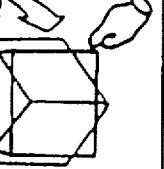 |
| DISPLACE-MENT ON SURFACE | 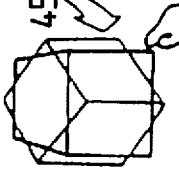 | 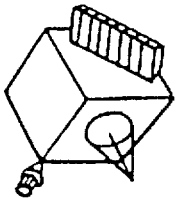 |
| DIRECT-ING TO PROCEED-ING DIRECTION | 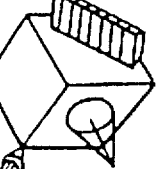 |  |
| FUNCTION | IMAGE PROCESSING | CURSOR OPERATION |
|---|---|---|
| UPRIGHT |  | — |
| STEP DISPLACE-MENT |  | — |
| PLURAL CURSOR DISPLAY | 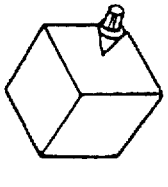 | — |

THREE-DIMENSIONAL INPUT DEVICE WITH DISPLAYED LEGEND AND SHAPE-CHANGING CURSOR

"THREE-DIMENSIONAL INPUT DEVICE WITH DISPLAYED LEGEND AND SHAPE-CHANGING CURSOR+38

BACKGROUND OF THE INVENTION

1. Field of the Invention

The present invention relates to an image processing apparatus and a method of image processing which performs image processing and simulation on a processed object produced and displayed through data processing using a computer, and more particularly relates to an image processing apparatus and a method of image processing for processing a processed object by detecting movement of hands and fingers of an operator.

2. Description of the Related Art

Processing such as displacement, modification or deformation of a processed object produced and displayed through data processing using a computer is performed by operation of controlling a cursor using a keyboard or a mouse.

An image processing apparatus and a method of image processing for processing a processed object by detecting movement of hands and fingers of an operator are disclosed in Japanese Patent Application Laid-Open No.62-44827 (1987), where a glove-shaped input device is used to detect the motion of the hand and fingers of an operator, and the processing operation of a processed object is performed by moving a handshaped cursor corresponding to the detected results.

An operation of a three-dimensional image using a glove-shaped input device is described in a paper titled "Network Virtual Reality System", K.Shinohara; PIXEL, No.132, pp 26 to 28 (1993).

In the image processing apparatus in which control of a cursor for operating image processing of a processed object displayed as an image is performed using a keyboard, it is difficult to freely control the image processing since the moving directions of the cursor are limited. In the image processing apparatus in which control of a cursor for operating image processing of a processed object displayed as an image is performed using a mouse, there is a problem of lack of reality in the operation since the operating direction of the mouse is on a horizontal plane, but the moving direction of the cursor is on a vertical plane of the image display. Further, both of the input operations of the keyboard and the mouse are two-dimensional operation, and accordingly it is difficult to operate and control a three-dimensional image processing.

On the other hand, although, in the glove-shaped input device, the input operation can be performed by three-dimensional operation, there is a disadvantage in that it is difficult to clearly display the function of cursor when processing operation is performed to a processed object and an acting point of a cursor to the processed object since the shape of the cursor is a projection of a hand.

SUMMARY OF THE INVENTION

An object of the present invention is to provide an image processing apparatus and a method of image processing capable of accurately performing control operation processing of an image using a cursor.

Another object of the present invention is to provide an image processing apparatus and a method of image processing capable of speedy and easily inputting operating condition for acting the processed object in a computer simulation.

One of the features of the present invention is characterized by an image processing apparatus comprising an image displaying means for displaying a processed object and an operating cursor, a cursor generating means for operating the operating cursor in corresponding to three-dimensional actions of the hand and the fingers of an operator, a processed object generating means for generating image data of the processed object processed according to the action of the operating cursor, which comprises a control changing means for changing the processing function and the shape of the operating cursor by judging the meaning of the three-dimensional actions of the hand and the fingers.

Another feature of the present invention is characterized by an image processing apparatus comprising an image displaying means for displaying an image, a three-dimensional action detecting means for detecting action and the three-dimensional positions of the hand and the fingers of an operator, a cursor generating means for generating operating cursor image data based on the detected result of the three-dimensional action detecting means, processed object generating means for generating image data of a processed object to be operated by an operating cursor displayed based on the operating cursor image data, and a display image generating means for synthetically displaying the operating cursor image data and the processed object image data on the image display means, which comprises a meaning judging means for judging the meaning of an instruction from the form of action of the hand and the fingers detected by the three-dimensional action detecting means, and a control changing means for changing the processing function and the shape of the operating cursor corresponding to the judged result of the meaning judging means.

A further feature of the present invention is characterized by an image processing apparatus comprising an image displaying means for displaying an image, a three-dimensional action detecting means for detecting action and the three-dimensional positions of the hand and the fingers of an operator, a cursor generating means for generating operating cursor image data based on the detected result of the three-dimensional action detecting means, a processed object generating means for generating image data of a processed object to be operated by an operating cursor displayed based on the operating cursor image data, and a display image generating means for synthetically displaying the operating cursor image data and the processed object image data on the image display means, which comprises a meaning judging means for judging the meaning of an instruction from the form of action of the hand and the fingers detected by the three-dimensional action detecting means, a legend displaying means for displaying the processing function and plural kinds of operating cursors corresponding to the result of the judgement of the meaning judging means, a condition setting means for setting a processing operating condition corresponding to each of the operating cursor, and the processed object generating means generating image data of the processed object corresponding to the processing operating condition.

A still further feature of the present invention is characterized by a method of image processing in which image processing of a processed object is performed by displaying the processed object and an operating cursor on an image display means and by operating the operating cursor corresponding to three-dimensional actions of the hand and the fingers of an operator, wherein the operating function and the shape of the operating cursor are changed by judging the meaning of the three-dimensional actions of the hand and the fingers.

According to the present invention, image processing of a processed object is performed by an image processing function and selection and moving operation of an operating cursor corresponding to the processing function through a three-dimensional actions of a hand and fingers.

The shape of the cursor expresses a processing function by symbolic shape of the processing function to support understanding of the processing function.

Further, a simulation image is expressed in a visually displayed state of the condition by setting operating conditions to a plurality of operating cursors and by acting the operating cursors on a processed object.

BRIEF DESCRIPTION OF THE DRAWINGS

FIG.3 is a view showing a function selecting legend in an image processing apparatus in accordance with the present invention.

FIG.4 is a view showing a cursor operating legend in an image processing apparatus in accordance with the present invention.

DETAILED DESCRIPTION OF THE PREFERRED EMBODIMENTS

Figure 1:
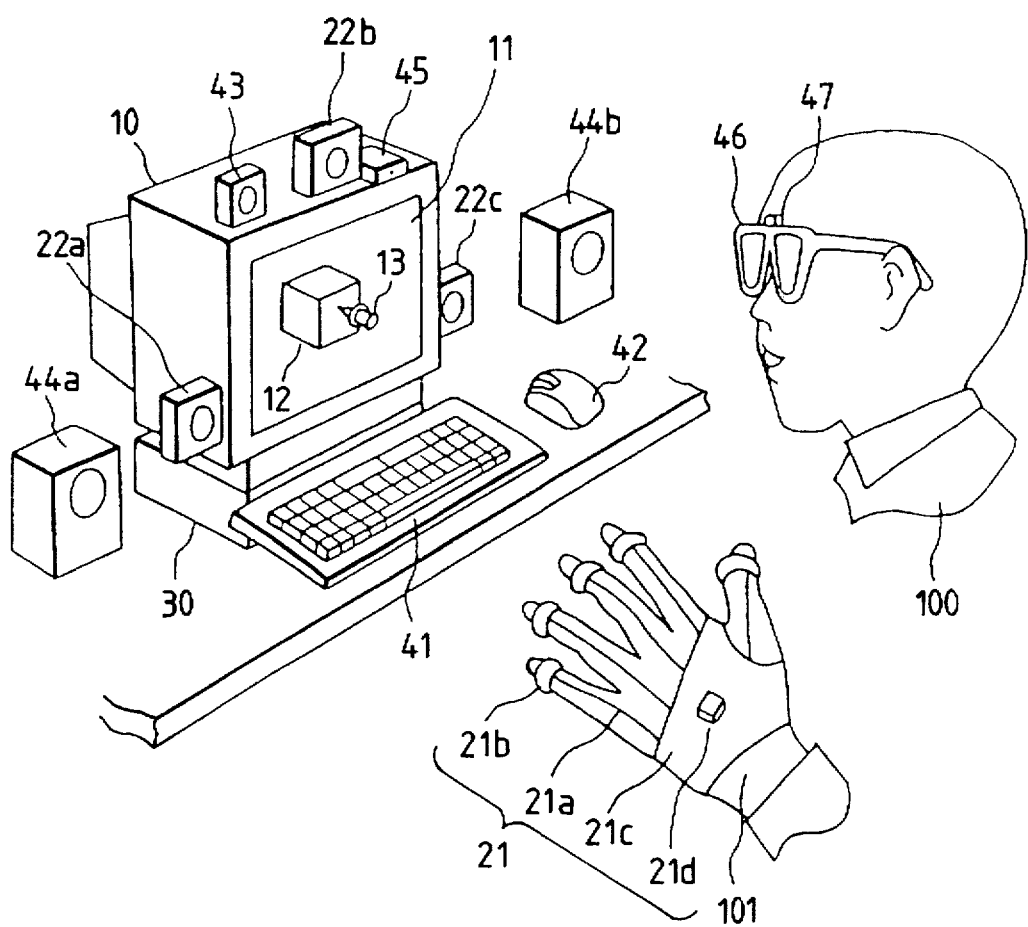
FIG.1 is a perspective view of the outer appearance of an image processing apparatus in accordance with the present invention.

FIG.1 is a perspective view of the outer appearance of an image processing apparatus in accordance with the present invention. The image processing apparatus performs image processing to a processed object (image) 12 such as deformation, displacement, cutting, rotation and the like by operating the processed object displayed on a displaying screen 11 of an image display device 10 using an operating cursor 13. The image processing apparatus is characterized by that when one of the processing functions such as deformation, displacement, cutting, rotation and so on is selected to a processed object, operation of the processing in the processing function is made easy by displaying a shape of the operating cursor 13 suitable for the selected processing function to give recognition to an operator.

A three-dimensional position detecting means for detecting the instructing action form and motion of a hand 101 and fingers of an operator 100 has a position indicating means 21 for transmitting position indicating signals mounted on the hand 101 of the operator 100 and three receivers 22a to 22c for receiving the position indicating signals placed in the image display device 10.

The position indicating means 21 has a plurality of ring-shaped finger position transmitters 21b receiving electric power and signals through signal lines 21a mounted on the individual fingers of the hand 101, and a hand position transmitter 21d mounted and positioned on the back of the hand 101 with a band 21c. The finger position transmitters 21b and the hand position transmitter 21d and the receivers 22a to 22c are used such that each of the three-dimensional positions of the transmitters 21b, 21d, that is, each of the positions of the three fingers and the hand 101, is measured (detected) by measuring a time lag from the time each of the transmitters 21b, 21d transmits an ultrasonic signal to the time the three receivers 22a to 22c receive the ultrasonic signal at three positions. Each of the transmitters 22b, 22d is controlled by a sync signal so that the ultrasonic signal is transmitted with time-sharing, and the generating source of the ultrasonic signal received by the each of the receivers 22a to 22c is specified, and the position detecting processing for each of the hand 101 and the fingers is executed with time-sharing.

Advantageously, the three-dimensional position detecting means may be modified by replacing the receiver 22b with a video camera, and then processing image data taken from the hand of the operator using a computer to detect the position. By doing so, the operator is not required to mount each of the transmitters for detecting the positions of the hand and the fingers on his hand, which leads to an advantage to eliminate work to mount them.

A computer 30 generates image data for displaying a processed object and cursor image data for displaying cursor and transfers them to the image display device 10. The computer 30 processes the cursor image data and the processed object data using the received signals from the receivers 22a to 22c, the instruction signals from a keyboard 41 and the mouse 42, and the input signal from a microphone 43 as a voice inputting means. The computer 30 also controls speakers 44a, 44b as an imitation sound generating means, and transmits a sync signal for switching control of a pair of stereo-glasses 46 for stereoscopically seeing a three-dimensional image by giving image switching sync signals to an image sync signal generator 45.

The stereo-glasses 46 have liquid-crystal shutters which are opened and shut corresponding to an image for left side eye or an image for right side eye displayed on the image display device 20 so that the operator 100 can see the images with his left eye or right eye, and the sync signal receiver 47 receives the switching control sync signal from the transmitter 45 to control opening and shutting operation of the liquid-crystal shutter.

Figure 2:
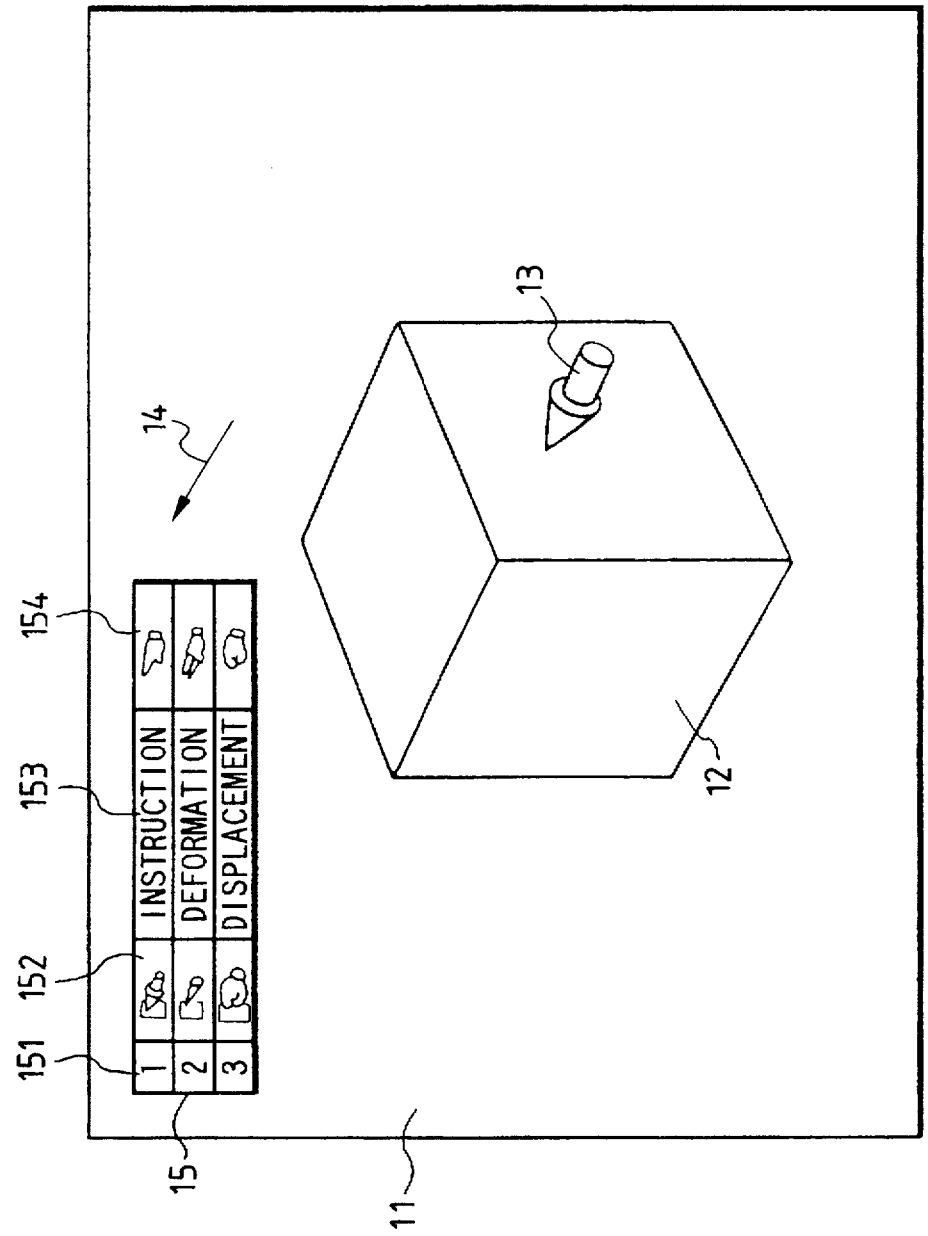
FIG.2 is an example of a displayed image on an image display device in an image processing apparatus in accordance with the present invention.

FIG.2 is a displayed image displayed on the display screen 11 of the image display device 10 in accordance with the present invention. A processed object 12, a cursor 13, a reference cursor 14, a legend display portion 15 and so on are displayed on the display screen 11.

In the legend display portion 15, plural kinds (plural shapes) of operating cursors 152, the corresponding processing function display characters 153 and the corresponding function selecting instruction form FIGS. 154 using form of fingers are displayed as a function selection legend.

Selection of function (operation cursor 152) is performed by forming the finger form in the corresponding selecting instruction action form, or by inputting number for the function selecting number from the keyboard 41, or by moving the reference cursor 14 to the frame of a desired function using the keyboard 41 or the mouse 42 to instruct. The function selecting instruction form FIGS. 154 showing examples of selecting instruction using the action forms of fingers provide instructing action forms for the function selection apt to make a mistake due to resemblance in the acting form of fingers as reference information to support the selecting operation by an inexperienced operator.

FIG.3 shows the relationship among the image processing functions, the operating cursor shapes and the selecting instruction action forms defined in order to display the function selecting legend in the embodiment. In the figure, operating cursors displaying together regular hexahedral processed objects and selecting instruction action forms of fingers are shown with pairing as examples.

Instruction (point) function is expressed by an arrow-shaped operating cursor, and the selection instructing action form for selecting the function is the form of straightening forefinger from the fist. The instructing point is the tip of the arrow.

Deforming function for deforming a processed object to the pushing direction is expressed by a cone-shaped operating cursor, and the selection instructing action form for selecting the function is the form of straightening forefinger and middle finger from the fist.

Deforming function for deforming a processed object to the pulling direction is expressed by a bent-tip cone-shaped operating cursor, and the selection instructing action form for selecting the function is the form of straightening forefinger and middle finger with bending the tips from the fist.

Displacement function for displacing a processed object is expressed by a grasping-hand-shaped operating cursor, and the selection instructing action form for selecting the function is the form of hand grasping an object.

Parallel displacement function for displacing a processed object in a parallel direction is expressed by a spatula-shaped operating cursor, and the selection instructing action form for selecting the function is the form of open-palm state.

Plane forming function for forming a surface of a processed object is expressed by a brush-shaped operating cursor, and the selection instructing action form for selecting the function is the same form of open-palm state as in the parallel displacement function.

Cutting function for cutting a processed object is expressed by a kitchen knife- or knife-shaped operating cursor, and the selection instructing action form for selecting the function is the same form of open-palm state as in the parallel displacement function.

In a case where selection instructing action forms are the same or similar such as the parallel displacement function, the plane forming function and the cutting function, the functions are displayed in the legend portion and the selection is performed by the selecting instruction by fingers together with the other instructing means such as voice or the mouse. Such a combined selecting instruction decreases number of kinds of the selection instructing action forms and consequently selection of many functions can be performed without complicated selecting instruction due to a slightly difference.

Rotation function for rotating a processed object is expressed by a top-shaped operating cursor, and the selection instructing action form for selecting the function is the form of rubbing forefinger with the inside of the thumb as to rotate a top.

By expressing the shape of the operating cursor with such a shape symbolizing the processing function to the processed object, the operator can easily recognize the contents of processing. By expressing the selection instructing action form of fingers for selecting a processing function with the form associating the processing function, an operator knowing the apparatus not so well can easily perform the processing operation.

FIG.4 is an example showing the relationship among the image processing function, the content of image processing corresponding to the motion of the operating cursor to a processed object expressed by a regular hexahedron and the instructing operation to the operating cursor in this embodiment. This image is displayed in the legend portion 15 as an operation legend after the processing function is selected.

Scroll processing function is such an image processing function that when an operating cursor is performed moving operation to be hidden in the back of a processed object or the operating cursor is operated to arrive at an arbitrarily set position near the processed object and further to be moved, the processed object is rotated in the opposite direction to the moving direction. That is, the scroll processing function is the image processing function that when the cursor is operated to move so as to instruct the shade portion of the processed object, the processed object is automatically rotated so as to bring the shaded portion to the front. There is an advantage in that the instruction input operation to the shaded portion of the processed object to bring the front becomes easy.

Displacement-on-surface processing function is such a function that even when a cursor operation to push a cursor in the surface of a processed object is performed, the operating cursor is moved in keeping the cursor on the surface. In a case where there is a component of moving operation parallel to the surface of the processed object, the operating cursor is moved on the surface corresponding to the component. This processing function makes the operation to instruct a point on the surface of the processed object easy, since the operating cursor does not enter into the inside of the processing object even if the position of finger to instruct moving of the operating cursor fluctuates.

Directing-to-proceeding-direction function is such a function that an operating cursor is always directed to the proceeding direction regardless of the positional relationship of fingers of an operating hand. For example, it is difficult to make an action to instruct the left side surface of a processing object using right hand. In such a case, this function directs an operating cursor in a proceeding direction (to the right) by moving a finger toward the proceeding direction (from left to right) to realizes the instruction to the left side surface of the processed object using the operating cursor.

Upright function is such a function that by contacting an operating cursor to a surface of a processed object, the processed object is raised at an arbitrary angle to the surface. This function is used when it is necessary to clarify an instructing position of an operating cursor to a processed object. In a case of deformation processing operation, the direction of deformation is clearly specified and therefore deformation toward the accurate direction can be realized.

Step displacement function is such a function that the amount of displacement of an operating cursor per one instructing operation and the amount of processing (displacement) of a processed object using the operating cursor are specified. This makes the image processing accurate or speedy.

Plural cursor display function is such a function that when a processed object is operated with one operating cursor, another operating cursor is displayed and another operation is performed to the processing object with the operating cursor. For instance, in a case of applying plural loads or plural temperatures to a processed object, the loads or temperatures can be applied to instructed arbitrary positions using plural operating cursors. Since such image processing display screens can visually display the simulation conditions, it becomes easy to understand the selecting conditions and the simulation results.

The selection of processing function and the operation of cursor are performed on the legend portion by using the instruction by finger forms together with the other instructing means such as voice or the mouse.

Figure 5:
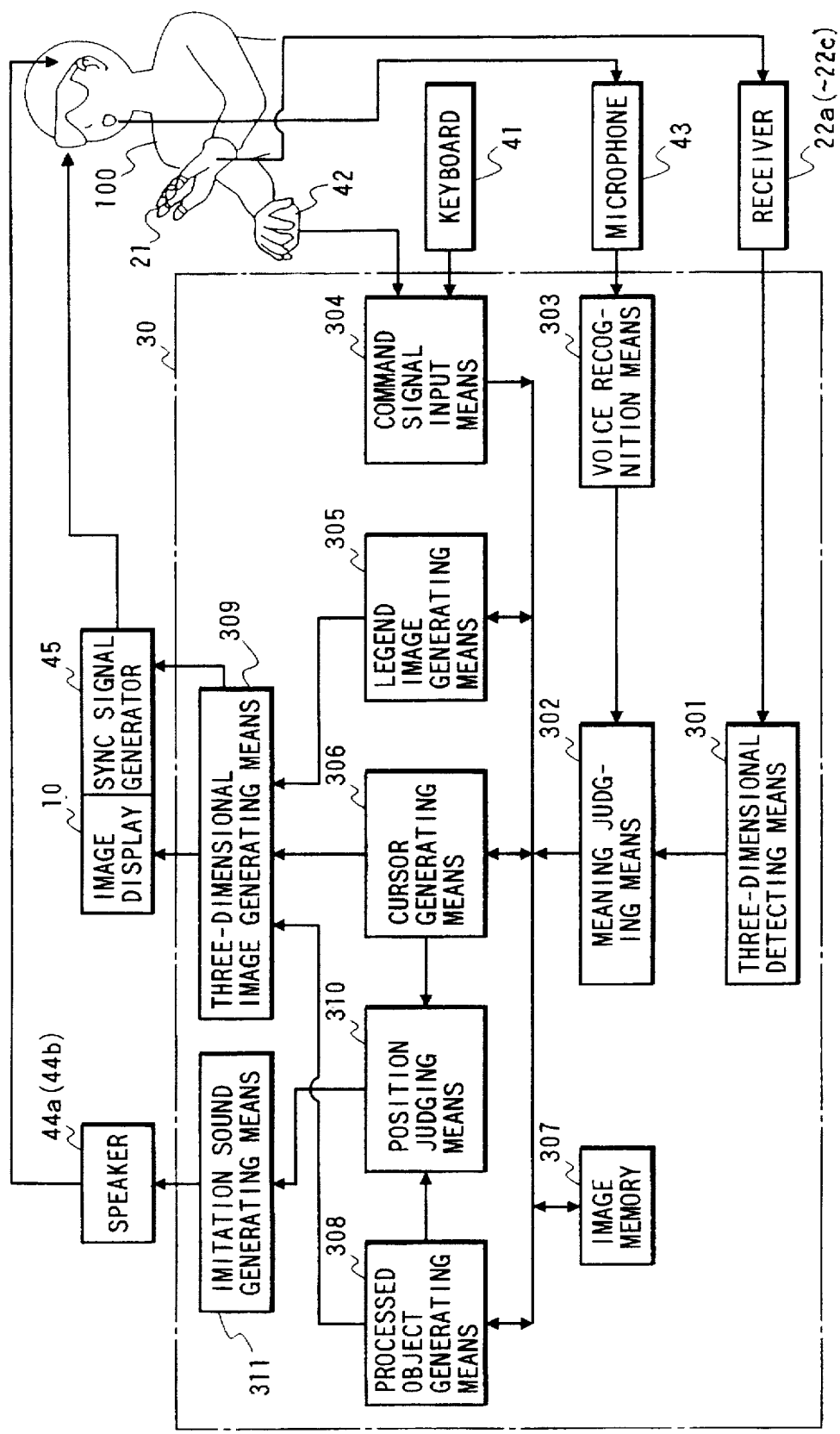
FIG.5 is a block diagram showing the function of an image processing apparatus in accordance with the present invention.

FIG.5 is a functional block diagram of an information processing program for realizing the image processing functions described above executed by the computer 30 in an image processing apparatus in accordance with the present invention.

The computer 30 comprises a three-dimensional action detecting means 301, a meaning judging means 302, voice recognition means 303, a command signal input means 304, legend image generating means 305, a cursor generating means 306, an image memory 307, a processed object generating means 308, a three-dimensional image generating means 309, a position judging means 310 and an imitation sound generating means 311.

The three-dimensional action detecting means 301 obtains three-dimensional positions of the hand 101 and the individual fingers of an operator 100 based on the individual signals from individual transmitters 21b, 21d received by the receivers 22a to 22c, and obtains the action forms of the fingers by sequentially monitoring the positions, and then transmits each of the obtained data to the meaning judging means 302 in the next stage.

The voice recognition means 303 analyzes voice signals input from a microphone 43 and converts to command signals. The command signals support the judgement in the meaning judging means 302 in the next stage and also the instruction input such as the operation or support the function selection displayed in a legend display portion 15. If the instruction input from the keyboard or the mouse during operating a cursor is eliminated by the support of the voice input, the cursor operating efficiency is improved and the operating cursor 13 can be operated with the both hands and consequently a more complex and real operation can be realized. Even in a case of instruction input with one hand, it is possible to use many kinds of processing functions since number of kinds of commands can be increased.

The meaning judging means 302 judges the function and the action selected and instructed based on the each of the signals given from the three-dimensional action detecting means 301 and the command signal given from the voice recognition means 303, and generates a control signal corresponding to the judged result. The displayed position of the operating cursor 13 is determined by moving on the display screen 11 corresponding to the action form of the hand and the fingers of the operator.

The command signal input means 304 generates a command signal corresponding to the instruction input signals from the keyboard 41 and the mouse 42. This command signal performs display control and selecting instruction of legend images generated in the legend image generating means 305 to be described later.

The legend image generating means 305 generates a legend image displayed on the legend display portion 15 for selecting and operating processing of the plural image processing functions. The legend image supplies the reference information for function selection and processing operation by the instructing action of the hand and fingers. The legend image makes it possible to perform selecting instruction input with other operating means and command means when other processing operation is selected during selecting or operating a function which is apt to make a mistake due to resemblance in the acting form of fingers.

The cursor generating means 306 corresponds to the judged result of the meaning judging means 302 and the input signal from the command signal input means 304, specifies an operating cursor 13 and a reference cursor corresponding to the selected and instructed function, refers the image data in the image memory 307, and generates cursor image data so as to display or displace it in the position specified by the display position data.

The processed object generating means 308 generates a processed object image data to display a processed object 12 to be processed and operated by the operating cursor 13 based on the data of the image memory 307. When the operating cursor 13 contacts to the processed object 12, image processing such as deformation, displacement, cutting, rotation or the like of the processed object 12 is performed corresponding to the function of the operating cursor 13, the operating content of the cursor after then and the property if the processed object 12.

The three-dimensional image generating means 309 generates the three-dimensional image display data to be displayed on the display screen 11 of the image display device 10 and the switching control sync signal. The three-dimensional image displayed on the display screen 11 contains the processed object 12, the operating cursor 13, the reference cursor 14 and the legend display portion 15. The image data is generated by synthesizing image data generated by the legend image generating means 305, the cursor generating means 306 and the processed object generating means 308. In order to obtain three-dimensional feeling from an image displayed on the plane display screen 11, image data for left eye and image data for right eye are alternatively generated so that the displayed images corresponding to the azimuth difference of the left eye and the right eye of the operator 100 are alternatively displayed, and the switching control sync signals to switch the liquid crystal shutters of the stereo-glasses 46 are generated so that the operator 100 can see the two kinds of the displayed images with the corresponding eyes.

The image display means 10 provide the images based on the image data for left eye and the image data for right eye generated by the three-dimensional image generating means 309 to the operator 100 by displaying the images alternatively. The switching control sync signal generator 45 transmits the switching control sync signals to open and shut the liquid crystal shutters so that the stereo-glasses 46 supplies the left eye with the image for left eye and the right eye with the image for right eye.

The position judging means 310 judges presence and absence of contact between the processed object 12 and the operating cursor 13 by comparing mutual relationship between the position of the processed object 12 and the position of the operating cursor 13.

The imitation sound generating means 311 generates a contact imitating sound signal corresponding to the function of the operating cursor 13 and the properties of the processed object 12 when the position judging means 310 judges that the processed object 12 and the operating cursor 13 are contact to each other. The generated contact imitating sound signal is given to the speakers 44a, 44b to convert to a contact imitating sound.

Figure 6:
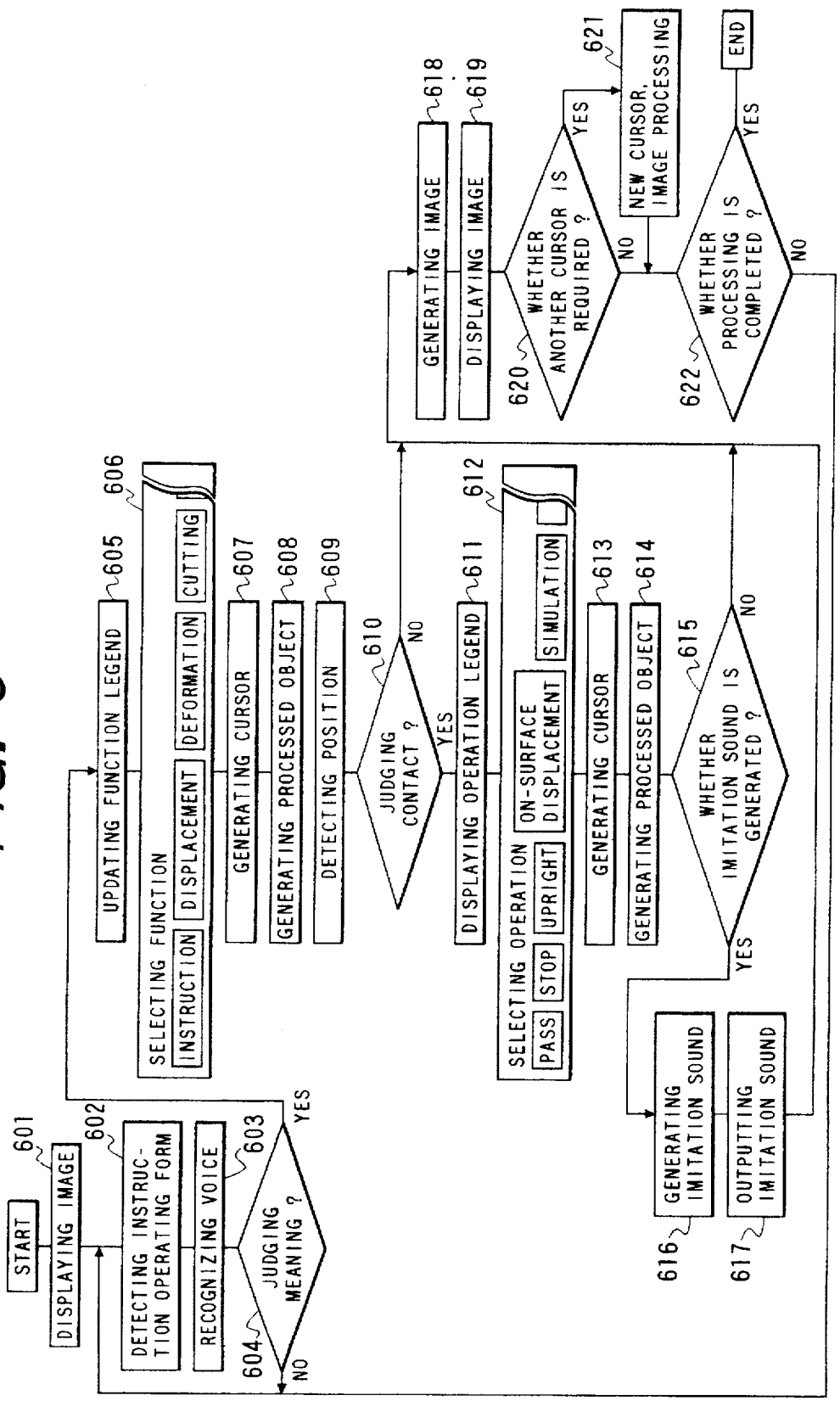
FIG.6 is a flow chart of information processing executed by a computer in an image processing apparatus in accordance with the present invention.

FIG.6 is a flow chart of information processing executed by the computer 30 to realize each of the function means as described above.

Step 601; An initial image as shown in FIG.2 is displayed. Although the function selecting legend as described in referring to FIG.3 is displayed in the legend display portion 15, "instruction" function is set as the initial state in this embodiment, and therefore the operating cursor 13 is displayed as a form for the "instruction". The processed object 12 is displayed with a pre-generated form, or not displayed.

Step 602; When the position instructing means 21 is brought to operation and a receiving signal of receiving signals from the individual transmitters 21b, 21d is generated, the positions and movements of the fingers are detected and the instructing action form is detected.

Step 603; The voice input signals of the operator 100 are analyzed with the voice recognition means, and the function selecting instruction or the cursor operating instruction is obtained.

Step 604; the instruction action form and the voice input signal are logically processed to perform meaning judgement.

Step 605; Based on the result of the meaning judgement, functional arranging order of the function selecting legend image displayed in the legend display portion 15 is updated. The selected and instructed processing function is placed in the top and the others are re-arranged in order of similar function, or in order of similar function in selecting instruction action form, or in order of high frequency of use. With arranging the processing functions in order of similar function in selecting instruction action form, there is an advantage in that it is possible to refer the other functions when selection or operating instruction is performed. And with arranging the processing functions in order of high frequency of use, there is an advantage in that the function selection is performed speedy.

The above is the same when a desired function frame on the legend display portion 15 is instructed by moving the reference cursor 14 using the mouse 42, or when a numerical value of the function selecting number is input by the keyboard 41.

Step 606; A processing function which the operator 100 requires is selected (selective input). Instruction input for selection is performed by a command such as the instruction action form of the fingers, the voice input, the keyboard or mouse input. Then an operating cursor 13 corresponding to a new processing function selected according to the meaning judgement is specified.

The processing functions are, as described in referring to FIG. 3, the instructing function to instruct a certain point, displacement function to displace a processed object, the deformation function to deform a processed object, the cutting function to cut a displayed object and so on.

Step 607; Cursor image data to display the shape of an operating cursor 13 symbolizing the processing function is generated corresponding to the selected processing function.

Step 608; Processed object image data to display the processed object 12 on the display screen 11 is generated. The processed object 12 is displayed by reading out pre-generated image data from the image memory, or is generated according to data input from the keyboard 41 or the mouse 42.

Step 609; The image position data of the processed object 12 and the image position data of the operating cursor 13 are detected.

Step 610; By comparing the image position data of the processed object 12 and the image position data of the operating cursor 13, presence or absence of the contact between the processed object 12 and the operating cursor 13 is judged.

Step 611; When the contact (closely approach) between the processed object 12 and the operating cursor 13 is detected, a processing operation legend to be executed by the operating cursor after then is displayed in the legend display portion 15.

Although a part of the processing operating legend is described in referring to FIG.4, as to the instruction functions there are the pass function for passing a moving operating cursor 13 through a processed object without causing anything, the stop function for stopping an operating cursor 13 on the surface of a processed object 12 even if the operating cursor 13 is operated to enter the inside of the processed object 12, the upright function for raising a processed object 12 instructed by an operating cursor 13 so as to have an arbitrary angle to a surface, the on-surface displacement function for moving an operating cursor 13 on the surface of a processed object 12 by the component in the direction along the surface of the processed object when the cursor 13 is operated to enter the inside of the processed object 13. As to the deformation function, there is the simulation function for deforming a processed object 12 by giving conditions using plural cursors 13.

Step 612; Selection of cursor operation suitable for a desired image processing is performed. The selecting instruction is performed by the selecting instruction action form of fingers, the voice input, the keyboard input or the mouse input. Since the selection of processing function and the selection of processing operation can be performed by the action of fingers, it is possible to perform the selecting instruction input while the operating cursor 13 is being operating. If the keyboard and the mouse are not used in the selection, the selection of processing operation can be performed speedy since motion of hand and motion of eye-line for inputting the selecting instruction are not required.

Step 613; After selecting the processing operation, cursor image data to display an operating cursor corresponding to the processing operation is generated. Since as to the stop, upright, on-surface displacement functions the three-dimensional action of hand and the operation of the operating cursor 13 on the display screen 11 do not correspond one-to-one, function cursor image data is re-generated.

Step 614; After the processed object 12 is processed by operating the operating cursor 13, image data of the processed object 12 is generated.

Step 615; Necessity of generating the imitation sound generated when the processed object 12 is processed by operating the operating cursor 13 is judged from the processing function, the processed object 12 and the operating cursor 13.

Step 616; If generation of the imitation sound is required, imitation sound data is generated corresponding to the properties of the processing function, the cursor operation and the processed object.

Step 617; The speakers are controlled so as to generate an imitation sound based on the imitation sound data. Since the imitation sound supplies auditory sense information together with visual sense information of the screen display to the operator, it makes easy to operate the operating cursor 13 as well as it makes accurate to operate the operating cursor 13.

Step 618; New display image data re-constructing the relationship between operation of the operating cursor 13 and the processed object 12 processed based on the operation is generated.

Step 619; The new display image data is displayed on the image display device 10 to provide it to the operator 100.

Step 620; Whether another operating cursor display is required is confirmed. If a processing operation requiring plural operating cursors is selected, the processing is branched to the block of new operating cursor setting, operating and image processing.

Step 621; A new operating cursor 13 required for processing operation is set. The old operating cursor 13 is stopped at the present position, or cooperates with new operating cursor. Then necessary image processing is performed and displayed.

Step 622; If completion of the processing is indicated, the image processing is ended. If not, the processing returns to Step 602 to repeat the same processing.

In a case where selective instruction of processing function and cursor operating instruction input are performed using a plurality of three-dimensional action detection means, instruction input from each of the three-dimensional action detecting means is discriminated, and function selection and cursor operation obtained by combining the independent function selection and cursor operation corresponding to each of the detecting means are performed.

Figure 7:
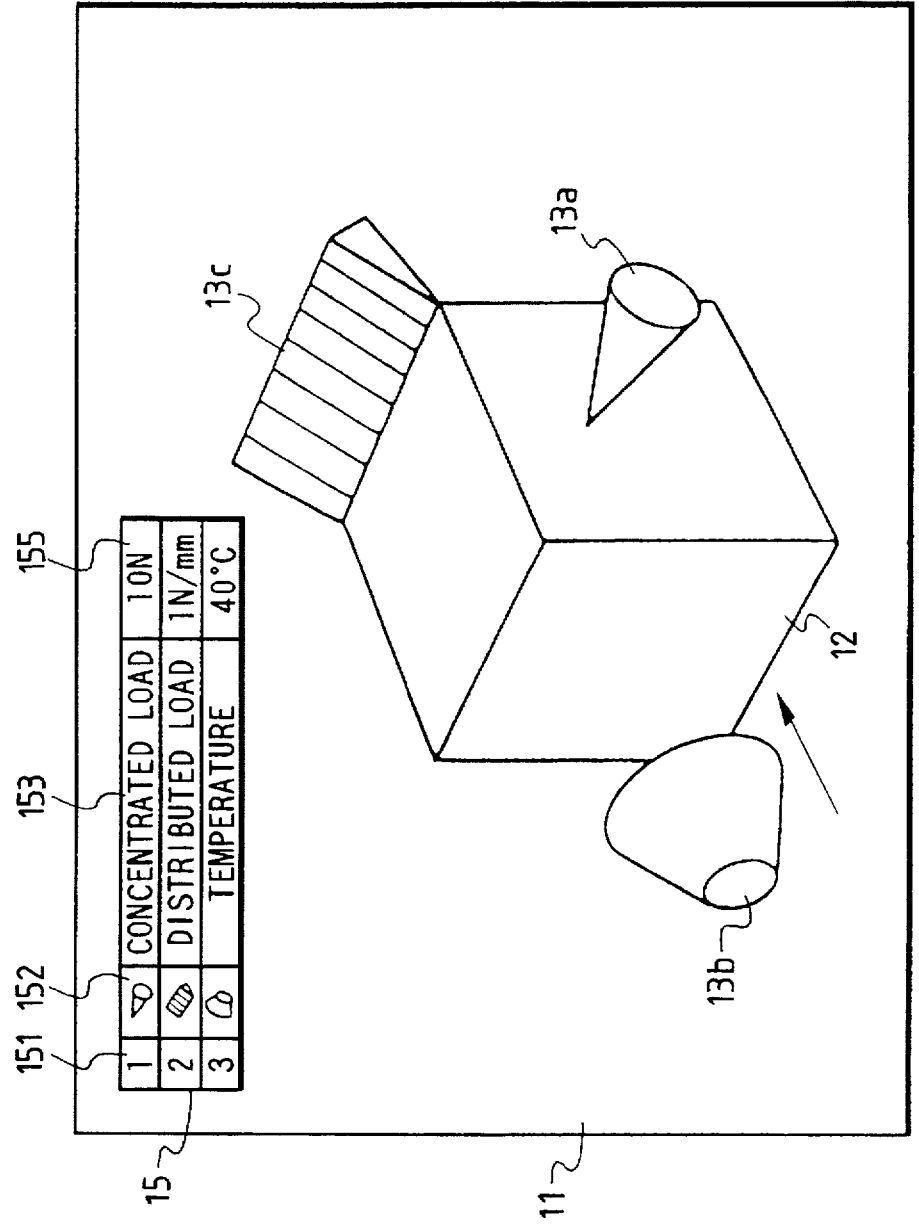
FIG.7 is a view showing a simulation displayed image executed by an image processing apparatus in accordance with the present invention.

FIG.7 shows a display screen when an image processing (operation) is performed using a plurality of operating cursors 13a, 13b, 13c in an image processing apparatus in accordance with the present invention. This image processing function is suitable for a simulation such as deformation of a processed object 13, and each of the operating cursors 13a to 12c is used to give the simulation condition.

Various kinds of the boundary conditions set to the operating cursors 13a to 13c can be set by inputting from the keyboard 41, and the set boundary conditions 155 are displayed in the legend display portion 15. The operating cursors shown as examples are an operating cursor 13a for concentrated load, an operating cursor 13b for distributed load and an operating cursor 13c for temperature.

Each of the operating cursors 13a to 13c is selected by the instruction action form of fingers or by instructing the function of the legend display portion 15 using a numerical value or the cursor, and each of the cursors is positioned in each of the arbitrary positions. The operating cursor 13b for temperature expresses that the acting heat source is moving toward the arrow direction.

Since the setting state of the boundary conditions in such an image processing display is visually expressed by the operating cursors 13a to 13c, there is an advantage in that the simulation state can be easily understood.

Figure 8:
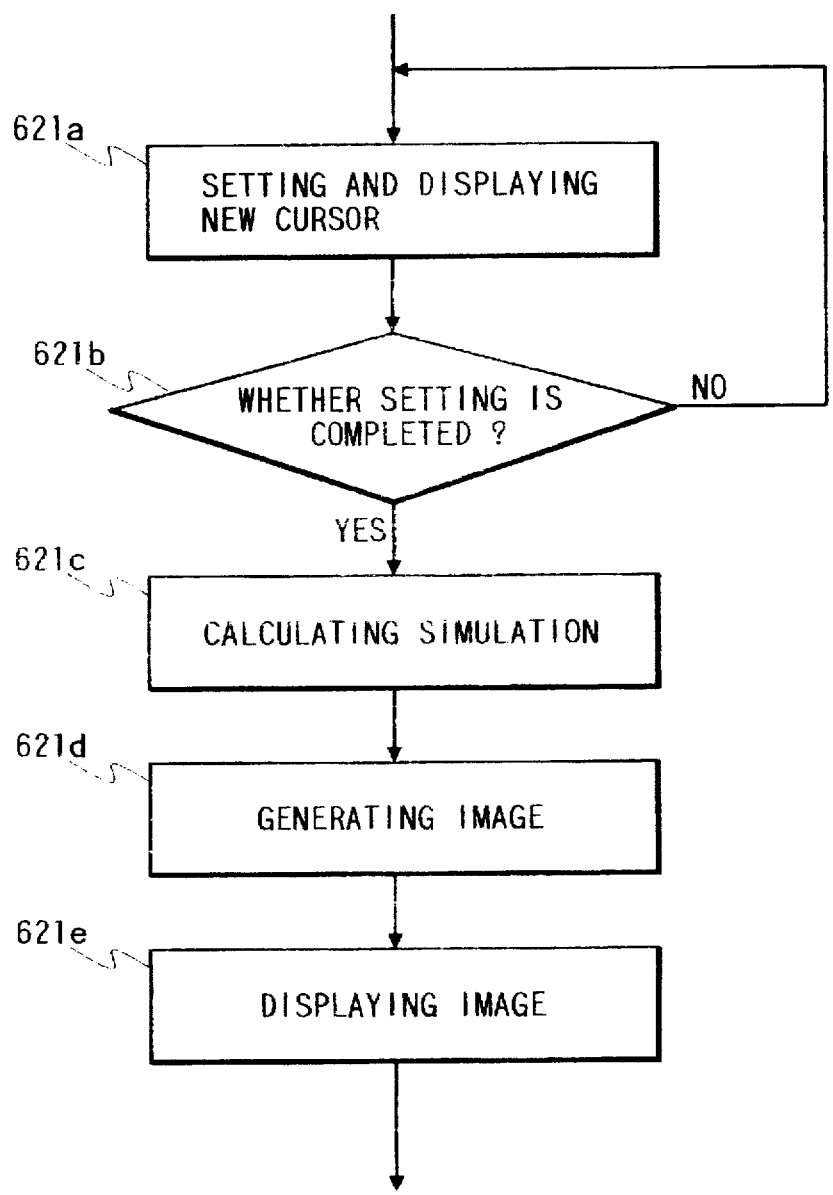
FIG.8 is a flow chart describing the details of a part of the flow chart shown in FIG.6.

FIG.8 shows a flow chart of an information processing contained in Step 621 described above in order to execute the simulation processing shown in FIG.7. This information processing comprises the processing steps of setting of each of operating cursors 13a to 13c and display processing 621a, judging processing for completion of setting 621b, simulation calculation processing 621c such as deformation of the processed object 12 executed according to the boundary conditions set by the operating cursors 13a to 13c after completion of setting, display image data generating processing 621d according to the result of the calculation, and image display processing 621e according to the display image data.

Figure 9:
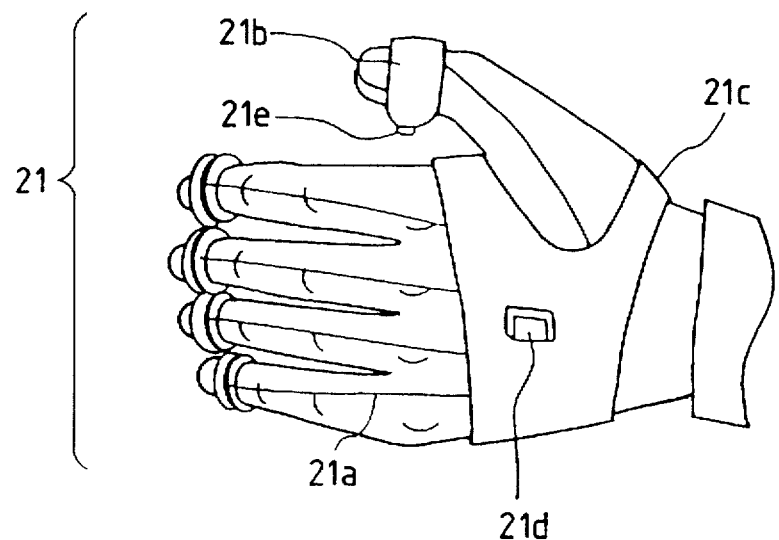
FIG.9 is a perspective view showing the outer appearance of a modified embodiment of a position indicating means in an image processing apparatus in accordance with the present invention.
Figure 10A:
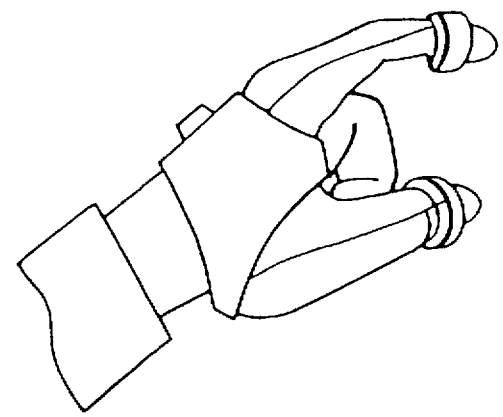
FIGS. 10A–B are perspective views showing the outer appearance of a state of use of the position indicating means shown in FIG.9.
Figure 10B:
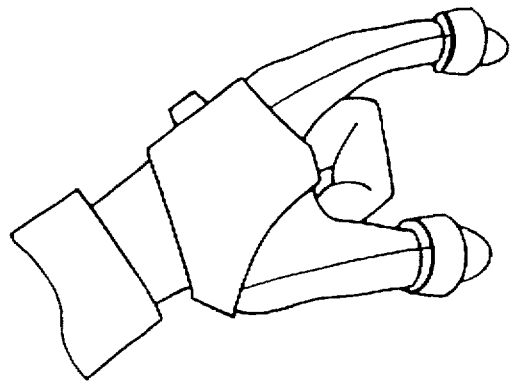

FIG.9 shows a modified embodiment of a position indicating means 21 in an information processing apparatus in accordance with the present invention. Constructing parts common to the embodiment shown in FIG.1 are identified by the same reference characters, and detailed description is omitted here.

This modified embodiment is characterized by providing a auxiliary switch means 21e in the middle finger side of a transmitter 21b mounted on the thumb. The auxiliary switch means 21e is used for generating an auxiliary command such as command to instruct displacement and stopping of the operating cursor 13.

The ON/OFF operation of the auxiliary switch means 21e is performed by pushing the auxiliary switch means 21e to the middle finger side or detaching the auxiliary switch means from the middle finger side. If the command using the auxiliary switch means is used so effectively that other command means is unnecessary to use, the selection and the operability of the operating cursor 13 are improved since motion of eye line and hands in operating other command means are not required.

It may be possible to detect the three-dimensional position by employing light generating means as the transmitters 21b, 21d and optical two-dimensional sensors as the receivers 23a to 23c.

Figure 11:
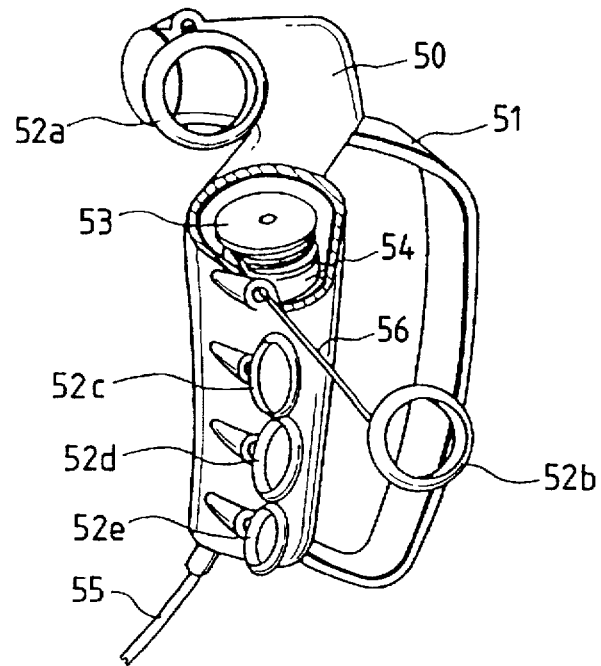
FIG. 11 is a perspective view showing the outer appearance of another modified embodiment of a position indicating means in an image processing apparatus in accordance with the present invention.
Figure 12:
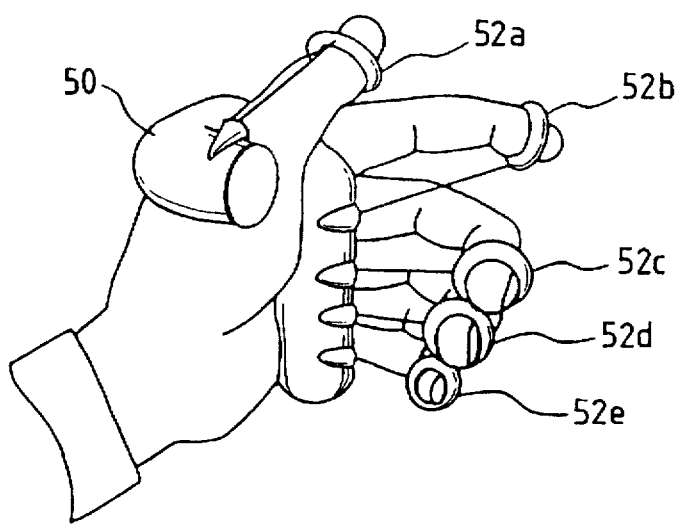
FIG.12 is a perspective view showing the outer appearance of a state of use of the position indicating means shown in FIG.11.

FIG.11 shows another modified embodiment of a position indicating means 21 in an information processing apparatus in accordance with the present invention. And FIG.12 shows a state of mounting the position indicating means shown in FIG.11 on a hand (fingers).

This modified position indicating means 21 comprises a main body 50 which can be gripped by hand, a band 51 for support the main body 50 in the palm of hand, fitting parts 52a to 52e for fit to fingers, a take-up member 53 arranged corresponding to each of the fitting parts, a wire member 56 wound in each of the take-up members 53 and having the extending outer end connected to the fitting part 52, a detecting member 54 for detecting rotating angle of the take-up member 53, a hand position detecting means, not shown, for specifying the three-dimensional position of the main body 50.

The wire member 56 is wound up with the take-up member 53. When fingers are stretched, wire members 56 connected to the fitting parts 52a to 52e fit to the tips of fingers are extracted, and accordingly the take-up parts 53 are rotated. When the fingers are returned to the original positions, the take-up members 56 are rotated so as to wind up the wire members 56.

The detecting means 54 detects the amount of stretching of each of the fingers by measuring the amount of rotation of the take-up member 53, and the three-dimensional position of the hand and the instructing action form of each finger are specified from the detected values of the hand position detecting means and the detecting means 54.

In the optical or ultrasonic three-dimensional position detection, it sometimes becomes difficult to detect the position when there is an obstacle between the transmitting side and the receiving side. According to this embodiment, if a magnetic sensor is employed to the hand position detecting means provided in the main body 50, the sensor is hardly affected by the obstacle since magnetic field is transmitted through the obstacle unless it is magnetic material. The positional relationship among the fingers are detected by the detecting member 54 mechanically linked with each of the fingers. Therefore, there is an advantage in that the positional detection of fingers is hardly affected by an external obstacle.

According to the present invention, processing operation of an image (processed object) can be speedy and easily performed by operating a cursor. Since the operating cursor having a shape symbolizing the image processing function is displayed, the processing operation can be performed accurately.

Further, in a simulation using a computer, the condition to act on a processed object can be speedy and easily set.

What is claimed is:

1. An image processing apparatus comprising:

image displaying means for displaying an image;

three-dimensional action detecting means for detecting actions and three-dimensional positions of a hand and fingers of an operator;

cursor generating means for generating operating cursor image data based on a detected result of said three-dimensional action detecting means;

processed object generating means for generating image data of a processed object to be operated upon by an operating cursor displayed based on said operating cursor image data;

display image generating means for synthetically displaying said operating cursor image data and said processed object image data on said image display means;

an image memory for storing image data indicative of a plurality of shaves of the operating cursor corresponding to a plurality of processing functions of said image processing apparatus, each of said Plurality of shapes visually symbolizing a respective one of said plurality of functions;

meaning judging means for judging a meaning of an instruction from a form of action of the hand and fingers detected by said three-dimensional action detecting means;

control changing means for changing a processing function of the image processing apparatus corresponding to a judged result of said meaning judging means;

cursor changing means for changing a shape of the operating cursor corresponding to the processing function of the image processing apparatus as changed by said control changing means, said cursor changing means changing said shape by referring to said image data in said image memory; and legend image generating means for generating function selecting legend image data which displays image processing function and an operating cursor corresponding to said image processing function.

2. An image processing apparatus according to claim 1, wherein said function selecting legend image data includes an instruction action form for selecting a specified image processing function.

3. An image processing apparatus according to claim 2, wherein said legend image generating means generates function selecting legend image data of the processing function approximated by the instruction action form.

4. An image processing apparatus according to claim 1, which comprises legend image generating means for generating operating legend image data which displays a cursor operation and the image processing corresponding to said cursor operation.

5. An image processing apparatus according to claim 4, which further comprises position judging means for judging presence or absence of contact between the processed object and the operating cursor, and said legend image generating means generates operating legend image data based on the result of the judgement of contact.

6. An image processing apparatus comprising image displaying means for displaying an image, three-dimensional action detecting means for detecting actions and three-dimensional positions of the hand and the fingers of an operator, cursor generating means for generating operating cursor image data based on the detected result of said three-dimensional action detecting means, processed object generating means for generating image data of a processed object to be operated by an operating cursor displayed based on said operating cursor image data, and display image generating means for synthetically displaying said operating cursor image data and said processed object image data on said image display means, which comprises:

meaning judging means for judging the meaning of an instruction from the form of action of the hand and the fingers detected by said three-dimensional action detecting means;

an image memory for storing image data of shape which is shape of operating cursor corresponding to each of processing functions of said image processing means and visually symbolizes each of said functions;

control changing means for changing the processing function of the image processing apparatus corresponding to the judged result of said meaning judging means;

cursor changing means for changing the shape of the operating cursor corresponding to the processing function of said image processing means referring to said image data in said image memory;

legend displaying means for displaying the processing function and plural kinds of operating cursors corresponding to the result of the judgement of said meaning judging means;

condition setting means for setting a processing operating condition corresponding to each of said operating cursor; and said processed object generating means generating image data of the processed object corresponding to said processing operating condition.

7. A method of image processing in which image processing of a processed object is performed by displaying said processed object and an operating cursor on image display means and by operating said operating cursor corresponding to a three-dimensional action of a hand and fingers of an operator, said method comprising steps of:

storing image data indicative of a plurality of shapes of the operating cursor corresponding to a plurality of processing functions, each of said plurality of shapes visually symbolizing a respective one of said plurality of processing functions;

judging a meaning of an instruction from a form of action of the hand and fingers detected by a three-dimensional action detecting means;

changing a processing function of the image processing apparatus corresponding to a judged result of said judging step; and changing a shape of the operating cursor corresponding to the processing function as changed by said processing function changing step, said shape being changed by referring to said image data; and displaying a function selecting legend image expressing an image processing function and an operating cursor corresponding to said image processing function.

8. A method of image processing according to claim 7, further comprising a step of:

displaying an operating legend image expressing a cursor operation and an image processing function corresponding to said cursor operation.

* * * * *